(12) United States Patent
Vorsmann et al.

(10) Patent No.: US 9,657,617 B2
(45) Date of Patent: May 23, 2017

(54) DEVICE AND METHOD FOR TREATING AN EXHAUST GAS CONTAINING PARTICLES

(71) Applicant: CONTINENTAL AUTOMOTIVE GMBH, Hannover (DE)

(72) Inventors: Christian Vorsmann, Koeln (DE); Jan Hodgson, Troisdorf (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/763,724

(22) PCT Filed: Dec. 13, 2013

(86) PCT No.: PCT/EP2013/076614
§ 371 (c)(1),
(2) Date: Oct. 7, 2015

(87) PCT Pub. No.: WO2014/114408
PCT Pub. Date: Jul. 31, 2014

(65) Prior Publication Data
US 2016/0040567 A1    Feb. 11, 2016

(30) Foreign Application Priority Data

Jan. 28, 2013  (DE) .......................... 10 2013 100 798

(51) Int. Cl.
*B03C 3/74*          (2006.01)
*F01N 3/01*          (2006.01)
(Continued)

(52) U.S. Cl.
CPC .............. *F01N 3/01* (2013.01); *B03C 3/0175* (2013.01); *B03C 3/06* (2013.01); *B03C 3/41* (2013.01);
(Continued)

(58) Field of Classification Search
CPC ...... F01N 3/027; F01N 3/2013; F01N 3/2026; F01N 3/281; F01N 13/0097
(Continued)

(56) References Cited

U.S. PATENT DOCUMENTS 4,634,806 A * 1/1987 Haag .......................... B03C 3/70
174/211
5,006,134 A * 4/1991 Knoll ........................ B03C 3/70
96/88
(Continued)

FOREIGN PATENT DOCUMENTS

CN         1946483       4/2007
CN         201884162     6/2011
(Continued)

OTHER PUBLICATIONS

Machine Translation of WO 2008000003, Translated on Sep. 1, 2016.*
Machine Translation of EP 2153902, Translated on Sep. 6, 2016.*

*Primary Examiner* — Patrick Maines
(74) *Attorney, Agent, or Firm* — Cozen O'Connor

(57) ABSTRACT

A device for treating an exhaust gas containing particles includes: an exhaust gas line, an emission electrode and an electric supply line for the emission electrode. The electric supply line is at least partially surrounded by an electric insulator and the electric insulator has an outer diameter, the electric insulator extending from the exhaust gas line substantially in the direction of the longitudinal axis of the exhaust gas line. The outer diameter measures at most 20 mm in the terminal region towards the longitudinal axis.

10 Claims, 2 Drawing Sheets

(51) Int. Cl.
*B03C 3/017* (2006.01)
*B03C 3/06* (2006.01)
*B03C 3/41* (2006.01)
*B03C 3/49* (2006.01)
*B03C 3/70* (2006.01)

(52) U.S. Cl.
CPC ................ *B03C 3/49* (2013.01); *B03C 3/70* (2013.01); *B03C 3/74* (2013.01); *B03C 2201/12* (2013.01); *B03C 2201/30* (2013.01); *F01N 2340/00* (2013.01); *Y02T 10/20* (2013.01)

(58) Field of Classification Search
USPC ....................... 60/295, 275, 311; 55/DIG. 10; 422/186.03, 186.04
See application file for complete search history.

(56) References Cited

U.S. PATENT DOCUMENTS

| | | | | |
|---|---|---|---|---|
| 2009/0241775 A1* | 10/2009 | Ogut | ................ | F01N 3/38 95/59 |
| 2009/0282817 A1* | 11/2009 | Masuda | ................ | B01D 53/32 60/300 |
| 2011/0158870 A1* | 6/2011 | Hodgson | ............... | F01N 3/2026 423/210 |
| 2012/0186447 A1* | 7/2012 | Hodgson | ............... | F01N 3/0275 95/79 |
| 2014/0209201 A1* | 7/2014 | Hodgson | ................ | F01N 3/01 138/108 |
| 2014/0290229 A1* | 10/2014 | Hirth | .................... | F01N 3/2026 60/320 |

FOREIGN PATENT DOCUMENTS

| | | | | |
|---|---|---|---|---|
| CN | 102498269 | | 6/2012 | |
| DE | 38 20 740 A1 | | 12/1980 | |
| DE | 38 04 385 C1 | | 2/1989 | |
| DE | 38 20 740 | | 12/1989 | |
| DE | 10 2006 000155 A1 | | 10/2006 | |
| DE | 10 2008 037 763 | | 3/2010 | |
| EP | 0 151 797 A2 | | 8/1985 | |
| EP | 2153902 A2 * | | 2/2010 | ............... B03C 3/41 |
| EP | 2 305 976 A2 | | 4/2011 | |
| JP | 2006-291708 | | 10/2006 | |
| WO | WO 2008/000003 A1 | | 1/2008 | |
| WO | WO 2008000003 A1 * | | 1/2008 | ............... B03C 3/41 |
| WO | WO 2011/029728 | | 3/2011 | |

* cited by examiner

DEVICE AND METHOD FOR TREATING AN EXHAUST GAS CONTAINING PARTICLES

CROSS-REFERENCE TO RELATED APPLICATIONS

This is a U.S. national stage of application No. PCT/EP2013/076614, filed on 13 Dec. 2013, which claims priority to the German Application No. 10 2013 100798.8 filed 28 Jan. 2013, the content of both incorporated herein by reference.

BACKGROUND OF THE INVENTION

1. Field of the Invention

The present invention relates to a device and a method for treating an exhaust gas containing particles. The device comprises an exhaust gas line, an emission electrode, and an electrical supply line for the electrical contacting of the emission electrode. The electrical supply line is enclosed in sections by an electrical insulator, which electrically insulates the electrical supply line in relation to the exhaust gas line. The electrical insulator comprises a surface against which the exhaust gas can flow.

2. Related Art

In motor vehicles having mobile internal combustion engines and in particular in motor vehicles having diesel drive, quantities of soot particles are regularly contained in the exhaust gas of the internal combustion engine, which cannot be emitted into the environment. This is specified by corresponding exhaust gas regulations, which specify limiting values for the number and the mass of soot particles per exhaust gas weight or exhaust gas volume and sometimes also for an entire vehicle. Soot particles are in particular non-combusted carbons and hydrocarbons in the exhaust gas.

A variety of different concepts for removing soot particles from exhaust gases of mobile internal combustion engines have already been discussed. In addition to mutually closed wall-flow filters, open secondary flow filters, gravity separators, etc., systems have also already been proposed in which the particles in the exhaust gas are electrically charged and then deposited with the aid of electrostatic attractive forces. These systems are known in particular under the name "electrostatic filter" or "electrofilter".

In "electrofilters", an agglomeration of small soot particles to form larger soot particles and/or an electrical charge in soot particles is caused by providing an electrical field and/or a plasma. Electrically charged soot particles and/or larger soot particles are generally substantially simpler to separate in a filter system. Soot particle agglomerates are transported more slowly in an exhaust gas flow because of their greater mass inertia and therefore accumulate more easily at deflection points of an exhaust gas flow. Electrically charged soot particles are drawn, as a result of their charge, toward surfaces, on which they accumulate and dissipate their charge. This also makes it easier to remove soot particles from the exhaust gas stream in operation of motor vehicles.

Generally multiple discharge electrodes and collector electrodes, which are positioned in the exhaust gas line, are proposed for such electrofilters. In this case, for example, a central discharge electrode, which extends approximately centrally through the exhaust gas line, and a surrounding lateral surface of the exhaust gas line, as a collector electrode, are used to form a capacitor. Using this arrangement of the discharge electrode and the collector electrode, an electrical field is formed transversely to the flow direction of the exhaust gas, wherein the discharge electrode can be operated using a high voltage, for example, which is in the range of approximately 15 kV. In this way, corona discharges can form in particular, by which the particles flowing with the exhaust gas through the electrical field are charged in a unipolar manner. As a result of this charging, the particles travel toward the collector electrode due to the electrostatic Coulomb forces.

In addition to systems in which the exhaust gas line is embodied as the collector electrode, systems are also known in which the collector electrode is formed as a wire lattice, for example, in this case particles accumulate on the wire lattice for the purpose of possibly bringing together the particles with further particles, to thus implement an agglomeration. The exhaust gas flowing through the lattice then entrains the larger particles again and supplies them to classical filter systems.

In the case of the regeneration of filter systems, in addition to intermittent regeneration by way of short-term heating, i.e., combustion of the soot (catalytically motivated, oxidative reaction), converting soot by nitrogen dioxide ($NO_2$) is also known. The advantage of continuous regeneration using nitrogen dioxide (CRT method) is that the conversion of soot can already take place here at significantly lower temperatures (in particular less than 250° C.). For this reason, continuous regeneration is preferred in many applications. However, this results in the problem that it must be ensured that the nitrogen dioxide in the exhaust gas comes into contact with the deposited soot particles to a sufficient extent.

Technical difficulties also result in this context in the implementation of continuous operation of such exhaust gas systems in motor vehicles, wherein the differing loads of the internal combustion engines result in different exhaust gas streams, exhaust gas compositions, and/or temperatures.

In addition, it is to be taken into consideration that the simplest possible components are to be used when providing such components for such a soot separating system, in particular also those components which may be produced cost-effectively in the scope of mass production. In addition, in particular in the design of the electrodes, it is to be taken into consideration that they must be positioned aligned in the exhaust gas line if necessary, in particular so that an undesired high stagnation pressure or undesired swirling of the exhaust gas does not occur in the region of the electrode.

Although the above-described systems have heretofore proven to be suitable for the treatment of soot particles at least in experiments, the implementation of this concept for mass production in motor vehicles nonetheless represents a substantial challenge. Soot particles accumulate in particular on the electrical insulation of the electrode and the counter electrode in relation to the exhaust gas line.

If a continuous soot deposit has formed from the electrode to the exhaust gas line via the electrical insulation, an electrical current ("leakage current") thus flows through it. Preventing a continuous soot accumulation has therefore previously been attempted. Thus, for example, introducing a gas via the electrical insulation into the exhaust gas line has been proposed, so that the soot particles are deflected away from the electrical insulation by the gas. Using targeted deflection devices for the exhaust gas, which deflect the exhaust gas from the electrical insulation, has also already been proposed.

Additionally or alternatively, designing the electrical insulation having the largest possible surface has previously been attempted, so that the formation of a continuous soot deposit becomes less probable. To enlarge the surface, the electrical insulators are provided with ribs extending longitudinally or transversely, for example.

To remove the soot deposits, intentionally increasing the temperature of the electrical insulator, so that the soot deposits burn off, has additionally already been proposed. For this purpose, it has been proposed, for example, that an electrical conductor be formed in the electrical insulator, which can elevate the temperature of the electrical insulator. Coating the electrical insulator using a catalytically active substance is also known.

However, it has been shown that in spite of all of these efforts, a continuous soot deposit on the electrical insulation between electrode and exhaust gas line cannot be prevented in operation of a motor vehicle.

SUMMARY OF THE INVENTION

An object of the invention is therefore to at least partially solve the problems described with reference to the prior art and in particular to specify a device and a method for treating an exhaust gas containing particles, using which particles in the exhaust gas can be effectively electrically charged even over a long period of time.

The objects are achieved in particular by a device for treating an exhaust gas containing particles, having an exhaust gas line, an emission electrode, and an electrical supply line for the emission electrode. The electrical supply line is enclosed at least in sections by an electrical insulator, wherein the electrical insulator has an external diameter. The electrical insulator extends from the exhaust gas line substantially in the direction of the longitudinal axis of the exhaust gas line. The external diameter in the end region toward the longitudinal axis is at most 20 mm [millimeter], preferably at most 10 mm, particularly preferably at most 5 mm.

The object is also achieved by the described device, in which, in particular also independently of the absolute value of the external diameter of the electrical insulator in the end region, the ratio of external diameter of the electrical insulator to length of the electrical insulator is less than 2.5, preferably less than 1, particularly preferably less than 0.5, or even less than 0.2. In this case, the length of the electrical insulator is the length of the electrical insulator in the extension direction from the exhaust gas line up to the exit of the electrical supply line from the electrical insulator. If the electrical insulator should not have a uniform external diameter, the greatest value of the external diameter is thus to be used to calculate the ratio.

The exhaust gas line is the part of the device on which all further components are indirectly or directly fastened and through which the exhaust gas of an internal combustion engine flows. The exhaust gas line is integrated in the exhaust gas system of the internal combustion engine in operation of the internal combustion engine.

The emission electrode emits electrons upon application of an electrical high voltage of at least 10 kV [kilovolt], preferably at least 15 kV, between the emission electrode and a counter electrode. The electrons in turn cause the particles contained in the exhaust gas to receive an electrical charge. Electrons are emitted upon application of the high voltage when the emission electrode has a small external radius of at most several µm [micrometer]. This is achieved in particular by a wire having a corresponding diameter or by a pointed electrode. The tip has a radius of only a few micrometers in this case. It is therefore preferable for the device to have a high-voltage source for generating voltages of at least 10 kV, particularly preferably at least 15 kV, or to be connectable to such a high-voltage source.

The electrical supply line connects the emission electrode in an electrically conductive manner to a terminal for the high-voltage source outside the exhaust gas line or to the high-voltage source itself. A part of the electrical supply line therefore at least extends through the exhaust gas line. However, all parts which connect the electrical feedthrough through the exhaust gas line and the emission electrode in the exhaust gas line in an electrically conductive manner are also considered to be part of the electrical supply line.

In order that a stable electrical potential can be applied to the emission electrode, the electrical supply line is electrically insulated in relation to the exhaust gas line. For this purpose, the electrical insulator encloses the electrical supply line at least in sections. This means in particular that the electrical supply line is completely enclosed by the electrical insulator in a plane orthogonal to a longitudinal axis of the electrical supply line. The electrical supply line is preferably also enclosed by an electrical insulator at its feedthrough through the exhaust gas line.

The external diameter is a measure of the size of the electrical insulator in cross section. The external diameter can be defined for all cross-sectional shapes of the electrical insulator. The external diameter of the electrical insulator is in particular the maximum length of a connection of two points on the external surface of the electrical insulator, which lie in a plane orthogonal to the extension direction of the electrical insulator, wherein the connection goes through the center point of the electrical insulator in the plane. In the case of an electrical insulator having a circular cross section, this is thus the external circle diameter. The longitudinal axis of the exhaust gas line is in particular the axis of rotational symmetry of the exhaust gas line and therefore substantially describes the central region of the exhaust gas line. The electrical insulator therefore extends radially inward from the exhaust gas line, wherein the electrical insulator does not have to be in contact with the exhaust gas line. The end region is accordingly the region of the electrical insulator which is oriented toward the middle of the exhaust gas line. The end region of the electrical insulator preferably has a length of at most 30 mm, very particularly preferably at most 15 mm in the extension direction.

The device proposed here is distinguished in particular in that the electrical insulator is sufficiently large to prevent flashover from the electrical supply line to the exhaust gas line, but additionally is kept as small as possible. A continuous soot layer can in fact form relatively rapidly between electrical supply line and exhaust gas line via the electrical insulator on such a relatively small electrical insulator, in particular with respect to its diameter and/or its surface, but the soot layer can be completely burned off by the voltage applied to the emission electrode, preferably by briefly increasing the voltage.

Specifically, it has been shown in the electrical insulators having the largest possible surface known from the prior art that leakage currents arise due to the formation of a continuous soot layer, which result in a drop in the voltage applied to the emission electrode. The power of a typical high-voltage source usable in a motor vehicle is not sufficient to completely burn off the deposited soot particles in the case of a relatively large electrical insulation. In contrast, it has been shown that if electrical insulators having a relatively small diameter in the end region are used, the power of the high-voltage source is sufficient to completely burn off the deposited soot at least in the end region, so that nearly continuous operation, i.e., nearly continuously maintaining the corona discharge, is possible.

The diameter of the electrical insulator is thus to be selected to be at most sufficiently large that when the electrical insulator is completely covered with soot, the soot in the end region can be burned off using the available high-voltage source. That is, an electrical current flows from the electrical supply line through the deposited soot to the counter electrode or exhaust gas line. The temperature increase of the deposited soot caused by the current results in burning off of the soot. It has been shown in this case that above all the soot is burned off starting from the end region. The operation of the device is not thus influenced, in contrast, in that deposited soot particles remain on the electrical insulator toward the exhaust gas line after the soot particles are burned off in the end region.

The high-voltage source used to generate the voltage applied to the emission electrode can preferably generate a voltage of at least 30 kV, wherein the power is limited to at most 150 W [watt], preferably at most 90 W.

The device according to the invention is preferably not to comprise those devices which have structure in the exhaust gas line for preventing deposits on the surface of the electrical insulator against which flow can occur. Such structure can comprise, in particular, flow guiding units, which guide the exhaust gas flow away from the surface of the electrical insulator against which flow can occur. Alternatively or additionally, the device according to the invention is preferably not to comprise those devices which are to prevent an accumulation of soot particles on the surface of the electrical insulator by introducing a gas into the exhaust gas line in the region of the surface against which flow can occur. Furthermore, it is preferably also not to include those devices in which the electrical insulator can be regenerated locally in a targeted manner from the deposited soot particles. In particular, those devices are thus to be excluded in which a heating element is formed in and/or on the electrical insulator. Preferably, alternatively or additionally to the above exceptions, those devices are also not to be comprised in which the electrical insulator has a catalytic coating, in particular a catalytic coating which promotes the oxidation of hydrocarbons and carbon monoxide.

According to one advantageous refinement of the device, the external diameter of the electrical insulator is at most 20 mm on its entire length, preferably at most 10 mm, particularly preferably at most 5 mm.

According to a further preferred embodiment, the device has a surface against which the exhaust gas can flow. The surface of the electrical insulator against which flow can occur is at most 500 mm² [square millimeter] in size. The surface against which flow can occur is preferably at most 400 mm², very particularly preferably at most 300 mm² in size.

The surface of the electrical insulator against which flow can occur is the surface which can come into contact with the exhaust gas in the exhaust gas line in operation of the device, i.e., the part of the surface of the electrical insulator which is located in the cross section of the exhaust gas line through which flow can occur. The size of the surface against which flow can occur can be ascertained in particular in that the device is filled in a removed state using a fluid which dyes the electrical insulator and the area of the electrical insulator thus dyed is measured. Due to such an embodiment of the electrical insulator, it is designed so that the entire surface of the insulator can be freed of deposited soot using the available power of the high-voltage source.

In order that the electrical supply line is electrically insulated in relation to the exhaust gas line or a counter electrode, the surface through which flow can occur is preferably at least 50 mm², particularly preferably at least 100 mm² in size.

The electrical supply line forms an intersection line with the electrical insulator inside the exhaust gas line. A spacing between the intersection line and the exhaust gas line is preferably sufficiently large that flashover does not occur in operation at an applied voltage of 25 kV. Alternatively, the spacing is to be as large or larger than the distance between a counter electrode and the emission electrode. Independently of the dimensioning of the device, the spacing is at least 10 mm [millimeter]. The spacing is preferably at most half as large as a diameter of the exhaust gas line through which flow can occur in the region of the emission electrode.

The intersection line is the line at which the electrical supply line exits from the electrical insulator inside the cross section of the exhaust gas line through which flow can occur. In the case of an electrical supply line having a circular cross section and an orthogonal arrangement of the electrical supply line in relation to the surface of the electrical insulator, the intersection line is a circle. The spacing of the intersection line to the exhaust gas line is the shortest distance from the intersection line to the exhaust gas line, in particular via the surface of the electrical insulator. The distance between electrical supply line (and also the emission electrode) and the exhaust gas line is therefore sufficiently large so that flashover does not occur.

In order that flashover does not occur from the electrical supply line to the exhaust gas line, the spacing between intersection line and exhaust gas line is preferably at least 15 mm, very preferably at least 20 mm, or even at least 30 mm. In particular in combination with an electrical insulator which is limited with respect to the size of the surface against which flow can occur, the size and shape of the electrical insulator is therefore limited.

According to one advantageous embodiment of the device, the electrical supply line is formed by a rod or a wire, which leads through the exhaust gas line. The at least one emission electrode is attached in an electrically conductive manner on the rod or wire. The emission electrode preferably has a tip for the emission of the electrons. The tip preferably points in or opposite to the flow direction of the exhaust gas and is centrally arranged in the exhaust gas line. Alternatively or additionally, a tip is arranged in the exhaust gas line and points radially outward.

According to a further embodiment of the device, the electrical supply line comprises a honeycomb body through which the exhaust gas can flow, wherein the electrical insulator is formed between honeycomb body and exhaust gas line. The honeycomb body through which flow can occur is preferably formed from metal plate layers, which comprise both smooth layers and also corrugated layers and form stacked and/or coiled channels through which flow can occur. The honeycomb body through which flow can occur is connectable through the exhaust gas line to a high-voltage source, so that the emission electrodes connected to the honeycomb body through which flow can occur are connectable in an electrically conductive manner to the high-voltage source. The honeycomb body through which flow can occur is preferably supported on at least three points via an electrical insulator in each case in the exhaust gas line. In this case, the electrical insulators have the dimensions according to the invention. The electrically conductive connection is produced in this case through at least one of the electrical insulators. By way of the use of a honeycomb body through which flow can occur, multiple emission electrodes can be held in the exhaust gas line distributed on the flow cross section thereof. In addition, the honeycomb body through which flow can occur ensures that the exhaust gas flow is more uniform.

In this case, the honeycomb body through which flow can occur is preferably held by a plurality of electrical insulators in the exhaust gas line.

If a wire stretched centrally in the axial direction in the exhaust gas line is used as the emission electrode, in general the exhaust gas line is used as the counter electrode. If a rod electrode extending in the exhaust gas direction is used, a lattice or very particularly preferably a honeycomb body through which flow can occur is generally used as the counter electrode.

The electrical supply line is particularly preferably a rod enclosed by a tubular insulator.

According to a further aspect of the invention, a method for treating an exhaust gas containing particles is proposed, in which the exhaust gas flows past an emission electrode in an exhaust gas line and an electrical supply line for the contacting of the emission electrode is enclosed at least in sections by an electrical insulator. The method comprises at least the following steps:

a) applying a high voltage to the emission electrode to generate a corona discharge,
b) causing the exhaust gas to flow against a surface of the electrical insulator,
c) depositing particles on the surface of the electrical insulator against which flow occurs,
d) combusting the deposited particles on a surface at most 500 $mm^2$ in size.

The method according to the invention is provided in particular for operating the device according to the invention.

In method step a), preferably a high voltage of at least 15 kV, very particularly preferably at least 18 kV is applied to the emission electrode. During method step b), the exhaust gas containing particles flows through the exhaust gas line and comes into contact with the emission electrode located in the exhaust gas line and the electrical insulator located in the exhaust gas line. In particular during method step c), particles from the exhaust gas are deposited on the surface of the electrical insulator against which flow occurs.

In method step d), the temperature of the deposited particles increases due to the current flow taking place through them. It is preferable in this case that at least 95% of the deposited soot particles in the end region are burned off using an electrical current having a current strength of at most 3 mA [milliampere] with an applied high voltage of 25 kV to 30 kV. It is very particularly preferable that the deposited particles are burned off by at least 95% on the surface against which flow can occur, of at most 500 $mm^2$ using a power of the current through the soot particles of at most 90 W, very particularly preferably at most 60 W.

It is also preferable for the current flow through the deposited soot particles to take place over a distance of at least 10 mm, particularly preferably at least 20 mm, or even at least 30 mm. In this case, the distance is the path of the electrons from the electrical supply line up to the exhaust gas line during the current flow.

The applied high voltage is preferably increased in method step d). By increasing the applied voltage in method step d), by preferably at least 5% of the voltage applied in method step a), particularly preferably at least 10% or even 15% of the voltage applied in method step a) or alternatively by at least 1000 V [volt] or even by at least 2000 V, the current flow through the deposited particles also increases, whereby the temperature thereof rises, which finally results in combustion of the deposited particles.

Method step d) is preferably performed at chronologically pre-definable intervals. Alternatively or additionally, the increase of the applied high voltage in method step d) can be performed after pre-definable distances covered by the motor vehicle. Therefore, regular burning off of the deposited particles on the surface of the electrical insulator against which flow can occur is ensured.

It is also preferable for the current generated by the applied high voltage to be ascertained at a first current strength and for the applied high voltage to be increased in method step d) if the first current strength exceeds a pre-definable current strength. The rise of the first current strength can be viewed as an indication that soot particles have been deposited on the surface against which flow can occur and therefore a higher leakage current flows, so that the applied high voltage is increased in method step d) as needed.

In this context, it is preferable for the pre-definable current strength to be dependent on operating parameters of an internal combustion engine which produces the exhaust gas. This is because the current flowing between emission electrode and counter electrode and exhaust gas lime is not only dependent on the leakage current via the particles deposited on the surface through which flow can occur, but rather also is dependent on the generated corona discharge. The corona discharge is in turn dependent on parameters of the exhaust gas, such as temperature, humidity, and particle density. It can thus be estimated better when a large number of particles has been deposited on the surface against which flow can occur.

The device according to the invention preferably has a control device, which is configured and equipped to be able to carry out the method according to the invention.

Furthermore, a motor vehicle is proposed, comprising the device according to the invention.

The details and advantages disclosed for the method according to the invention may be transferred and applied to the device according to the invention and vice versa.

BRIEF DESCRIPTION OF THE DRAWINGS

The invention and the technical environment are explained hereafter as an example on the basis of the figures. It is to be noted that the figures show particularly preferred embodiment variants of the invention, but it is not restricted thereto. In the schematic figures.

DETAILED DESCRIPTION OF THE PRESENTLY PREFERRED EMBODIMENTS

Figure 1:
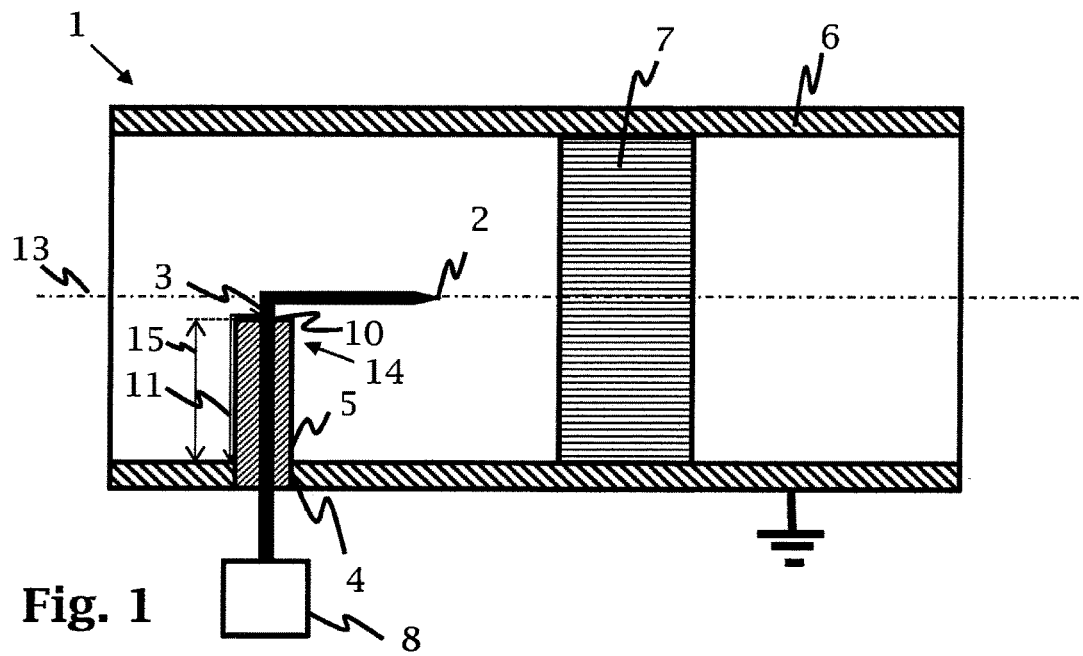
FIG. 1: shows an embodiment according to the invention of the device in a longitudinal section.
Figure 2:
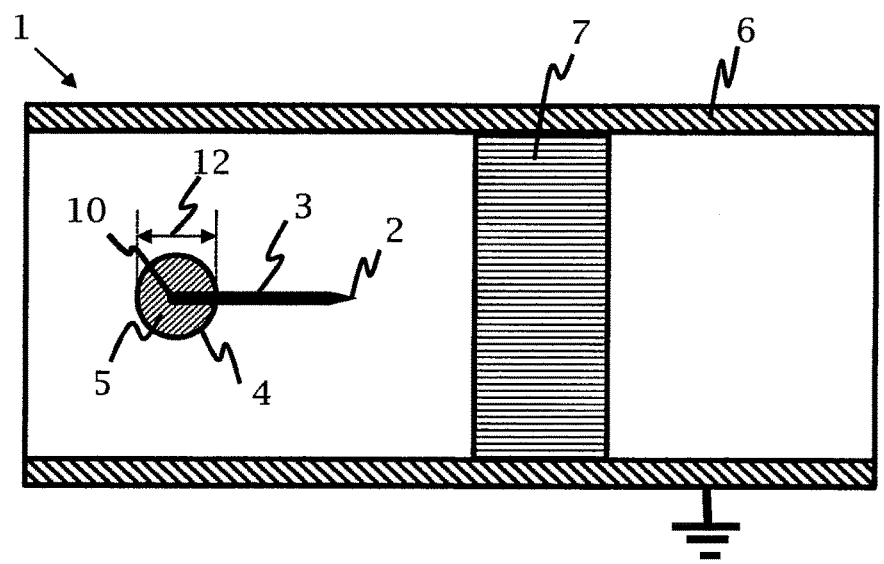
FIG. 2: shows the embodiment according to FIG. 1 in a further longitudinal section.

FIG. 1 and FIG. 2 schematically show a device 1 according to the invention in two longitudinal sections, which are orthogonal to one another, having an exhaust gas line 6, an emission electrode 2, and an electrical supply line 3. The exhaust gas line 6 has a longitudinal axis 13. The electrical supply line 3 is electrically conductively connected to a high-voltage source 8 and guided inside an insulator 4 through the exhaust gas line 6. The electrical supply line 3 is enclosed by the electrical insulator 4 at the feedthrough through the exhaust gas line 6. The electrical insulator 4 has an external diameter 12, a length 15, and an end region 14. The external diameter 12 is at most 20 mm in the end region 14. The surface of the insulator 4, which is in contact with the interior formed by the exhaust gas line 6, is identified as the surface 5 against which flow can occur. The surface 5 against which flow can occur is therefore the surface that can be in contact with the exhaust gas in operation, in particular also with cleaned insulator 4. The device 1 furthermore comprises a honeycomb body, which is used as a counter electrode 7. The electrical supply line 3 forms an intersection line 10 with the insulator 4. The spacing 11 from the intersection line 10 to the exhaust gas line 6 at least sufficiently large that no flashover occurs in operation using a voltage of 25 kV applied to the emission electrode 2. The spacing 11 is preferably at least 50 mm.

In operation, the exhaust gas of an internal combustion engine, which contains particles, flows through the exhaust gas line 6, wherein the particles are ionized by a corona discharge generated using a high voltage at the emission electrode 2. An electrical field is generated by applying an electrical potential to the emission electrode 2 via the electrical supply line 3 in relation to the counter electrode 7 or exhaust gas line 6. In operation, soot particles are deposited on the surface 5 of the insulator 4 against which flow can occur. As soon as a continuous soot deposit has formed between the electrical supply line 3 and the exhaust gas line 6, a leakage current flows. When further soot particles have been deposited on the surface 5 against which flow can occur, such a large current flow thus occurs through the deposited particles that they combust, wherein the temperature of the soot is increased by the current flow.

It can be seen in FIG. 2 that the surface 5 against which flow can occur substantially corresponds to an external lateral surface of a tube.

Figure 3:
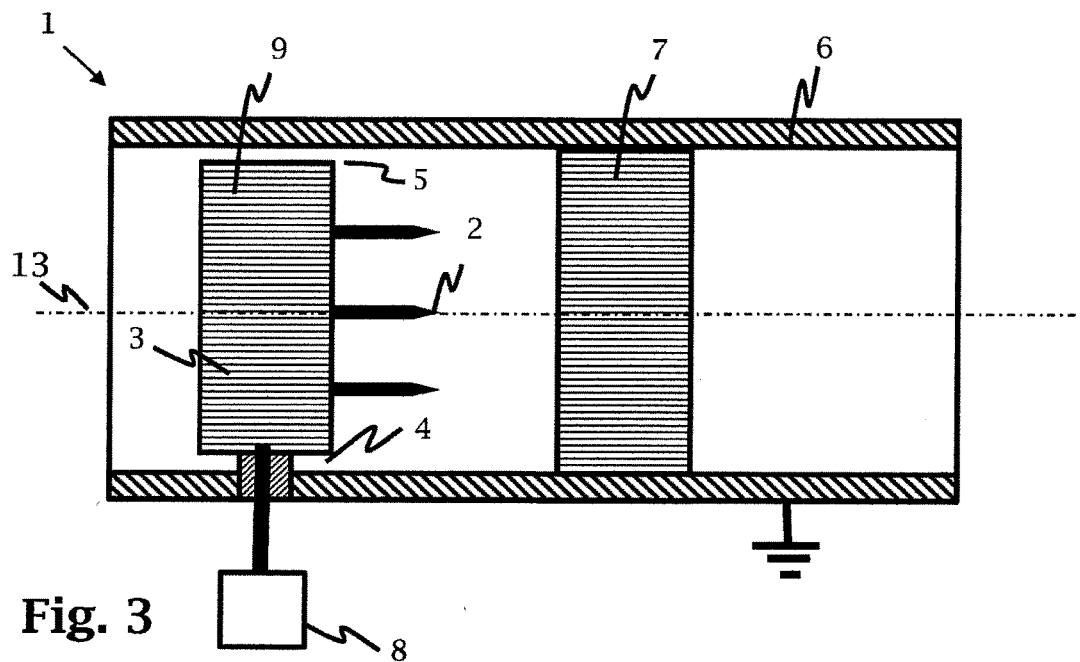
FIG. 3: shows a further embodiment of the device in a longitudinal section.
Figure 4:
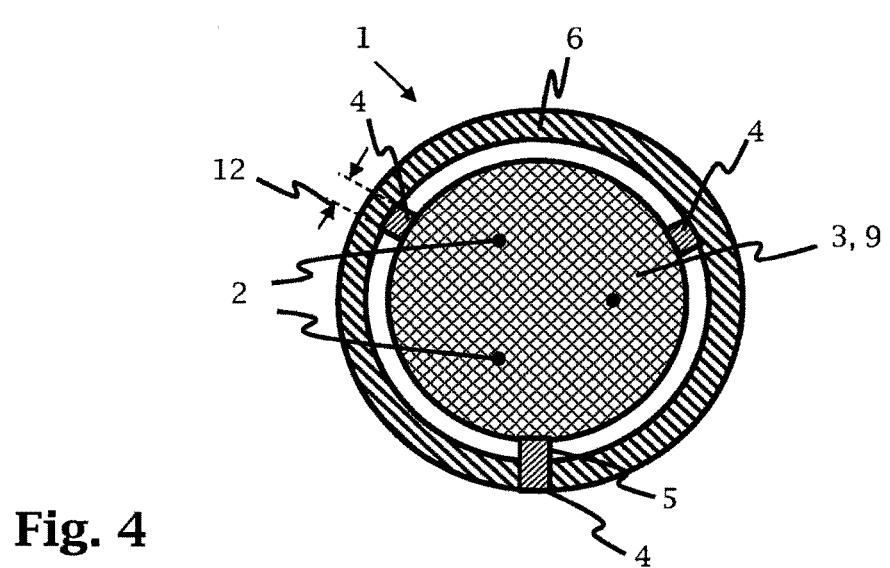
FIG. 4: shows a cross-sectional view of the embodiment according to FIG. 3.

FIGS. 3 and 4 show a further exemplary embodiment of a device 1 according to the invention in a longitudinal section and in a cross section, respectively. Only the differences in comparison to the embodiment shown in FIG. 1 will be described hereafter. In this embodiment, the electrical supply line 3 is formed by a honeycomb body 9 through which flow can occur. The electrical contacting of a plurality of emission electrodes 2 is therefore performed via the honeycomb body 9. The honeycomb body 9 is electrically insulated in relation to the exhaust gas line 6 via multiple electrical insulators 4 and is held thereby. The emission electrodes 2 are connected in an electrically conductive manner to the honeycomb body 9. The electrical field therefore forms between the emission electrodes 2 and the counter electrode 7.

In the embodiment, the surface 5 against which flow can occur is formed by surfaces of the electrical insulators 4, which each have an external diameter 12. In this embodiment, the external diameter 12 of the electrical insulators is also selected so that combustion of the soot particles deposited thereon can be achieved by increasing the high voltage. In this case, a current flow through the deposited soot particles results in a temperature increase of the soot particles.

Using the invention, long-term operation of a device 1 for treating an exhaust gas containing particles, in which the particles in the exhaust gas are ionized, is ensured. Reestablishing the insulation function of the electrical insulation can be ensured using simple, available structure by the invention.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device (1) for treating an exhaust gas containing particles, comprising:
    an exhaust gas line (6) having a longitudinal axis (13);
    an emission electrode (2);
    an electrical supply line (3) configured to supply electricity to the emission electrode (2);
    a counter electrode (7) arranged inside the exhaust gas line (6);
    an electrical insulator (4) arranged inside the exhaust gas line (6) and spaced apart, with respect to the longitudinal axis, from the counter electrode (7), the electrical insulator (4) having an external diameter (12), wherein the electrical supply line (3) is enclosed at least in sections by the electrical insulator (4),
    wherein the electrical insulator (4) extends from the exhaust gas line (6) toward the longitudinal axis (13) in a direction orthogonal to a direction of the longitudinal axis (13) of the exhaust gas line (6),
    wherein the external diameter (12) is at most 20 mm in an end region (14) of the electrical insulator (4) proximate the longitudinal axis (13), and
    wherein a section of the electrical supply line (3) inside the exhaust gas line (6) and not enclosed by the electrical insulator (4) is oriented in the direction of the longitudinal axis (13) so as to project towards the counter electrode (7) such that application of electrical potential to the emission electrode (2) via the electrical supply line (3) generates an electric field between the emission electrode (2) and the counter electrode (7).

2. The device (1) as claimed in claim 1, wherein the external diameter (12) of the electrical insulator (4) is at most 20 mm over its entire length (15).

3. The device (1) as claimed in claim 1, wherein the electrical insulator (4) has a surface (5) against which the exhaust gas can flow, wherein the surface (5) is at most 500 mm$^2$ in size.

4. The device (1) as claimed in claim 3, wherein the surface (5) is at least 50 mm$^2$ in size.

5. The device (1) as claimed in claim 1, wherein:
    the electrical supply line (3) forms an intersection line (10) with the electrical insulator (4) inside the exhaust gas line (6), and
    a spacing (11) between the intersection line (10) and the exhaust gas line (6) is sufficiently large to prevent the occurrence of flashover during operation of said device at an applied voltage of 25 kV.

6. The device (1) as claimed in claim 5, wherein the spacing (11) between intersection line (10) and exhaust gas line (6) is at least 15 mm.

7. The device (1) as claimed in claim 1, wherein:
the electrical supply line (3) has a honeycomb body (9) through which the exhaust gas can flow, and
the electrical insulator (4) is arranged between the honeycomb body (9) and the exhaust gas line (6).

8. The device as claimed in claim 7, wherein the honeycomb body (9) is held in the exhaust gas line by a plurality of electrical insulators.

9. A method for treating an exhaust gas containing particles, in which the exhaust gas flows past an emission electrode (2) in an exhaust gas line (6) and an electrical supply line (3) configured to contact of the emission electrode (2) is enclosed at least in sections by an electrical insulator (4) having a surface (5), wherein a counter electrode (7) is arranged inside the exhaust gas line (6) and a section of the electrical supply line (3) inside the exhaust gas line (6) and not enclosed by the electrical insulator (4) is oriented in the direction of a longitudinal axis (13) of the exhaust gas line (6) so as to project towards the counter electrode (7), the method comprising:
  a) applying a high voltage to the emission electrode (2) to generate an electric field between the emission electrode (2) and the counter electrode (7) and a corona discharge;
  b) causing the exhaust gas to flow against the surface (5) of the electrical insulator (4);
  c) depositing particles on the surface (5); and
  d) combusting the deposited particles on an area of the surface (5) at most 500 mm$^2$ in size.

10. The method as claimed in claim 9, wherein step d) further comprises increasing the applied high voltage.

* * * * *